United States Patent [19]

Sasada

[11] Patent Number: 4,941,723
[45] Date of Patent: Jul. 17, 1990

[54] ROD SHAPED LINEAR LIGHT DIFFUSION APPARATUS

[75] Inventor: Shigeru Sasada, Kyoto, Japan

[73] Assignee: Dainippon Screen Mfg. Co., Ltd., Japan

[21] Appl. No.: 324,399

[22] Filed: Mar. 15, 1989

[30] Foreign Application Priority Data

Mar. 18, 1988 [JP] Japan ................................. 63-63400
Apr. 5, 1988 [JP] Japan ................................. 63-82323
Apr. 6, 1988 [JP] Japan ................................. 63-83127

[51] Int. Cl.$^5$ .......................... G02B 6/00; G02B 3/04; G02B 3/08
[52] U.S. Cl. ................................. 350/96.10; 350/433; 350/452
[58] Field of Search ............... 350/96.18, 96.20, 96.10, 350/444, 446, 452, 433

[56] References Cited

U.S. PATENT DOCUMENTS 4,099,535  7/1978  Hubachek ........................ 350/97 X
4,108,540  8/1978  Anderson et al. ............... 350/433 X
4,298,249  11/1981 Gloor et al. ..................... 350/452 X
4,535,240  8/1985  Vigurs ............................. 350/452 X Primary Examiner—William L. Sikes
Assistant Examiner—Akm E. Ullah
Attorney, Agent, or Firm—Ostrolenk, Faber, Gerb & Soffen

[57] ABSTRACT

A linear light diffusing apparatus is formed of a transparent cylindrical rod. A white layer is formed on the outer periphery of the cylindrical rod along the longitudinal direction thereof. A plurality of elongated saw tooth shaped grooves are formed on the opposite side of the outer periphery. Light entering from one end of the transparent cylindrical rod is irregularly reflected by the white layer. The irregularly reflected light is refracted by the saw tooth shaped grooves to be linearly condensed at a prescribed position.

23 Claims, 11 Drawing Sheets n=1.2 n=1.5 n=1.8 n=2.0 n=4.0 n=1.5
a=2R n=1.5
a=3R n=1.8
a=2R n=1.8
a=1.3R n=2.0
a=2R

OS = s
SL = h n = 1.5    K = 4
m(=4R)

ROD SHAPED LINEAR LIGHT DIFFUSION APPARATUS

BACKGROUND OF THE INVENTION

The present invention relates to a rod shaped linear light diffusion apparatus for diffusing incidental light and, more specifically, to a rod shaped linear light diffusion apparatus capable of providing desired luminous fluxes.

DESCRIPTION OF THE RELATED ART

Rod shaped linear light diffusion apparatuses are known. FIG. 1A illustrates a conventional rod shaped linear light diffusion apparatus.

Referring to FIG. 1A, the conventional rod shaped linear light diffusion apparatus 1 includes a rod 2 for transmitting light from a light source 4 and a reflecting plate 5, and diffusing the light at desired portions. A diffused reflection layer 3 is formed on the surface of the rod 2 and a reflecting mirror 6 is provided on an end portion opposed to the light entering side of the rod 2. The diffused reflection layer 3 is formed by coating the surface of the rod 2 with a silicon rubber which includes a suspended fine white powder of a material having a high refractive index. Examples of such a material include titanium, potassium titanate, and zinc oxide. Light transmitted through the rod 2 is diffused when it encounters the diffused reflection layer 3. By appropriately thickening the diffused reflection layer 3, most of the light is diffused to the inside of the rod 2. The light transmitted through the rod 2 without. encountering the diffused reflection layer 3 is reflected by the mirror 6 and returned to the inlet side of the rod 2.

FIG. 1B is a cross sectional view along the line 1B—1B of FIG. 1A. Luminous fluxes which have reached the diffused reflection layer 3 are irregularly reflected. Out of the irregularly reflected luminous fluxes, a luminous flux $l_1$ which forms an incidence angle with the periphery of the rod 2 which is larger than a critical angle is totally reflected at the periphery of the rod and is continuously reflected within the rod 2 until it again encounters the diffused reflection layer 3. Meanwhile, luminous fluxes which form an incidence angle with the periphery of the rod 2 which is smaller than the critical angle are refracted at the periphery and externally radiated.

An example of such a rod shaped linear light diffusion apparatus which reflects light having directivity used as a light source for color separation scanning within an image scanning apparatus, such as facsimile, is disclosed in, for example, U.S. Pat. No. 4,797,711, which is incorporated herein by reference. FIG. 2A is a perspective view of a main portion of such a facsimile. However, the rod shaped linear light diffusion apparatus is not limited in use to the linear light source of a copying machine, facsimile or the like.

As illustrated in FIG. 2B, the rod shaped linear light diffusion apparatus 1 may be used within a table lamp, floor lamp, ceiling lamp, etc. The apparatus can be connected to an ordinary light source or other light sources such as solar radiation.

The apparatus 1 advantageously radiates little heat. Further, the apparatus radiates light with approximately uniform intensity over the length of the rod. Further, the apparatus can be readily maintained, changed, and the like. However, the apparatus is an inefficient source of radiation since luminous fluxes emitted therefrom are dispersed, as illustrated in FIG. 1B.

FIG. 3 shows a cylindrical condensor lens 16 provided behind the rod shaped linear light diffusion apparatus 1 to solve the above described problem.

The lens condenses the dispersed luminous fluxes. However, as shown in FIG. 3, the luminous fluxes emitted from the apparatus 1 do not radiate from one point. As shown by the dotted lines, each optical path intersects the optical axis at different points. Therefore, the luminous fluxes cannot be converged to one point by the cylindrical lens 16. Now, if a region to be irradiated is not linear but wide in a direction orthogonal to the axis of the apparatus, it is desired that a constant illuminance be maintained regardless of the distance between the surface to be irradiated and the apparatus 1. In such case, the luminous fluxes radiated from the apparatus 1 must be parallel fluxes. However, it is difficult to provide parallel luminous fluxes by the conventional rod shaped linear light diffusion apparatus, as described above.

The illuminance of the luminous fluxes radiated from the conventional rod shaped linear light diffusion apparatus 1 is higher at a central portion and lower at opposing end portions. That is, the distribution of illuminance is not uniform. Therefore, a region having a prescribed area cannot be uniformly illuminated.

SUMMARY OF THE INVENTION

It is an object of the present invention to provide desired luminous fluxes in a rod shaped linear light diffusion apparatus.

Another object of the present invention is to generate luminous fluxes which can be linearly condensed.

A further object of the present invention is to generate parallel fluxes from a transparent rod shaped linear light diffusion apparatus.

A still further object of the present invention is to evenly distribute the illuminance of light generated from a transparent rod shaped linear light diffusion apparatus.

Since the rod shaped linear light diffusion apparatus has the above described components, incident light can be diffused in a desired direction with respect to the optical axis (intersecting the longitudinal direction of the apparatus), and the direction can be selected as desired. Therefore, desired luminous fluxes can be obtained from the rod shaped linear light diffusion apparatus.

Other features and advantages of the present invention will become apparent from the following description of the invention which refers to the accompanying drawings.

DETAILED DESCRIPTION OF THE PREFERRED EMBODIMENTS

The luminous fluxes which can be linearly condensed, parallel fluxes, and luminous fluxes capable of providing uniform distribution of illuminance. Apparatuses capable of providing these fluxes will be described in the following.

(1) A Rod Shaped Linear Light Diffusion Apparatus Capable of Linearly Condensing Light In the following, three preferred embodiments which are capable of linearly condensing are described.

(i) First Embodiment

Figure 1A:
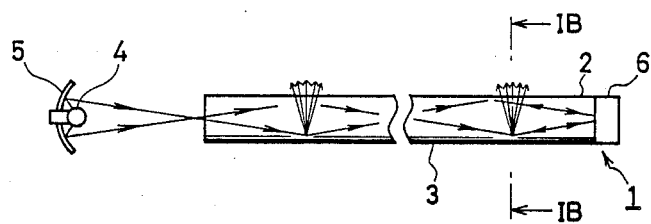
FIG. 1A is a schematic diagram of a conventional rod shaped linear light diffusion apparatus.
Figure 1B:
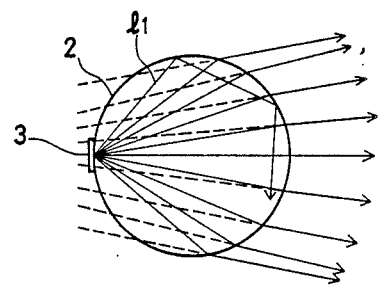
FIG. 1B is a cross sectional view through the line 1B—1B of FIG. 1A.
Figure 3:
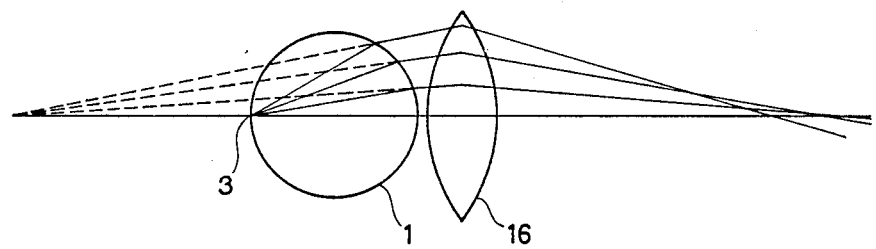
FIG. 3 illustrates the prior art.
Figure 2A:
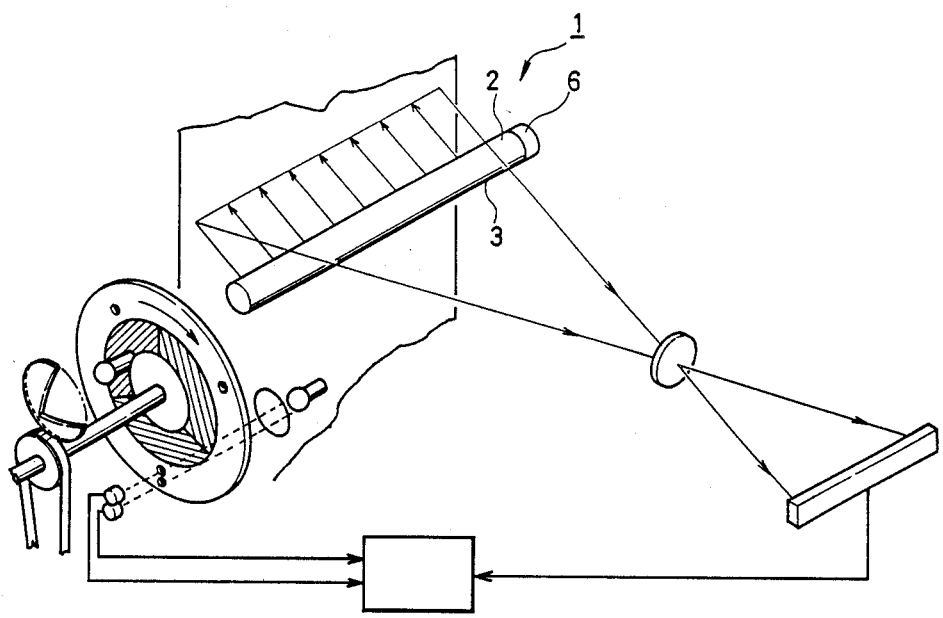
FIG. 2A is a perspective view of a main portion of a facsimile to which the present invention is applied.
Figure 2B:
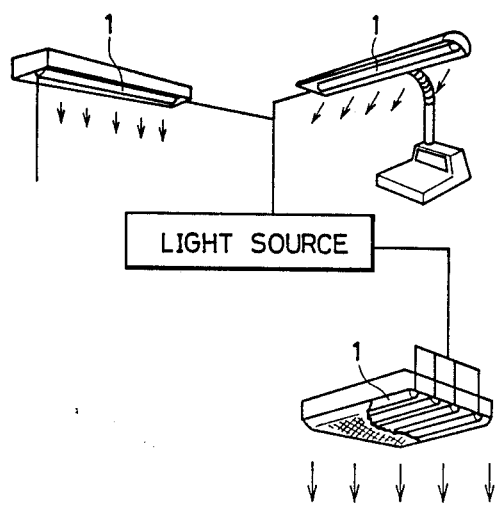
FIG. 2B is a schematic diagram of an illuminating apparatus to which the present invention is applied.
Figure 4:
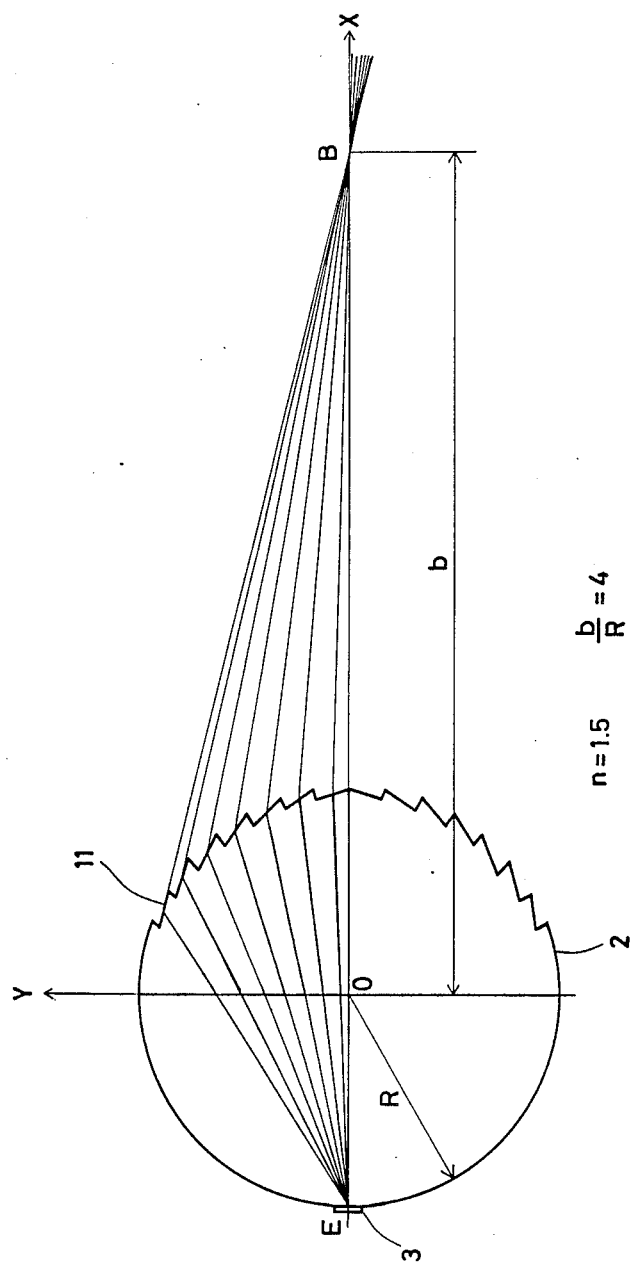
FIGS. 4 and 5 illustrate a first embodiment of the present invention.

Referring to FIG. 4, which corresponds to FIG. 1B, a diffused reflection layer 3 is formed at the point E on the outer periphery of the rod 2 and a plurality of saw tooth shaped grooves 11 are formed on the peripheral surface opposing the diffused reflection layer 3. The grooves need not be formed on the outer periphery of the rod 2. For example, a member with a plurality of saw tooth shaped grooves can be attached to a member with a prism section to form a rod with a plurality of saw tooth shaped grooves. Light reflected at the point E is diffused in a prescribed direction by the saw tooth shaped grooves 11 and condensed on the point B on an X axis passing through the center 0 of the rod 2.

In this case, the refractive index n of the rod 2 is 1.5 and $b/R=4$.

In FIG. 4, the reference character b represent the distance from the center O of the rod 2 to the condensing point B and the reference character R represents the radius of the rod 2.

The operation of the saw tooth shaped grooves 11 will be described with reference to FIG. 5.

A plurality of saw tooth shaped grooves 11 are formed along the longitudinal direction of the rod 2 at the peripheral surface of the rod 2 opposite the point E. However, only one groove 11 is shown in FIG. 5 for convenience of illustration.

The respective reference characters represent the following items.

point A: an intersection of a normal of a CD surface at the point C and the X axis, with the coordinate value being (a, 0)
point B: an intersection of a refracted luminous flux and the X axis with the coordinate value being (b, 0)
point C: refracting point of the luminous flux
CD: surface of the groove 11
$\theta$: angle of the luminous flux reflected from the point E with the X axis
$\alpha$: incident angle of the luminous flux at the CD surface
$\beta$: angle of irradiation of the luminous flux at the CD surface
$\gamma$: angle of the line CA with the X axis
n: refractive index of the rod.

The following relations can be applied.

$$n\sin\alpha = \sin\beta \quad (1)$$

$$\gamma = \alpha + \theta, \therefore \alpha = \gamma - \theta \quad (2)$$

$$\sin\beta = \sin\{(\beta-\gamma)+\gamma\} = \sin(\beta-\gamma)\cos\gamma + \cos(\beta-\gamma)\sin\gamma \quad (3)$$

at $\triangle OCB$, $$\angle CBO = \beta - \gamma$$

by applying the sine theory at $\triangle BCO$, $$\frac{R}{\sin(\beta-\gamma)} = \frac{\sqrt{(b R\cos 2\theta)^2 + R^2\sin^2 2\theta}}{\sin 2\theta}$$

assuming that $$\sin(\beta-\gamma) = \frac{r\sin 2\theta}{\sqrt{b^2 - 2bR\cos 2\theta + R^2}} = K, \text{ then}$$

$$\cos(\beta-\gamma) = \sqrt{1 - K^2}$$

from the equations (1), (2) and (3), $$n\sin(\gamma - \theta) = K\cos\gamma + \sin\gamma\sqrt{1-K^2} \quad (4)$$

$$n\sin\gamma\cos\theta - n\cos\gamma\sin\theta = K\cos\gamma + \sin\gamma\sqrt{1-K^2}$$

$$n\cos\theta\tan\gamma - n\sin\theta = K + \tan\gamma\sqrt{1-K^2}$$

$$(n\cos - \sqrt{1-K^2})\tan\gamma = K + n\sin\theta$$

$$\therefore \tan\gamma = \frac{n\sin\theta + K}{n\cos\theta - \sqrt{1-K^2}}$$

The angle $\gamma$ of the surface of each saw tooth shaped groove 11, by which the value of the distance b is made constant, can be determined from the angle of reflection $\theta$ of the luminous flux form the point E, the refractive index n of the rod 2, the radius r of the ros 2, and the distance b to the point at which the luminous flux is condensed. If the grooves 11 are formed at the positions determined by and angle $\gamma$, the luminous fluxes reflected from the point E are all condensed to the point B on the X axis as shown in FIG. 4, whereby a rod shaped linear light diffusion apparatus illiminating a linear region can be provided. In the embodiment shown in FIG. 4, the refractive index n of the transparent rod $2=1.5$ and $b/r=4$, and the increment of the angle of reflection $\theta$ of the luminous fluxes from the point E is 5°. The increment of the angle $\theta$ may be arbitrarily set at as small a value as desired.

(ii) Second Embodiment

In the second embodiment, light is condensed by a rod with a refractive index higher than 2.

Figure 6:
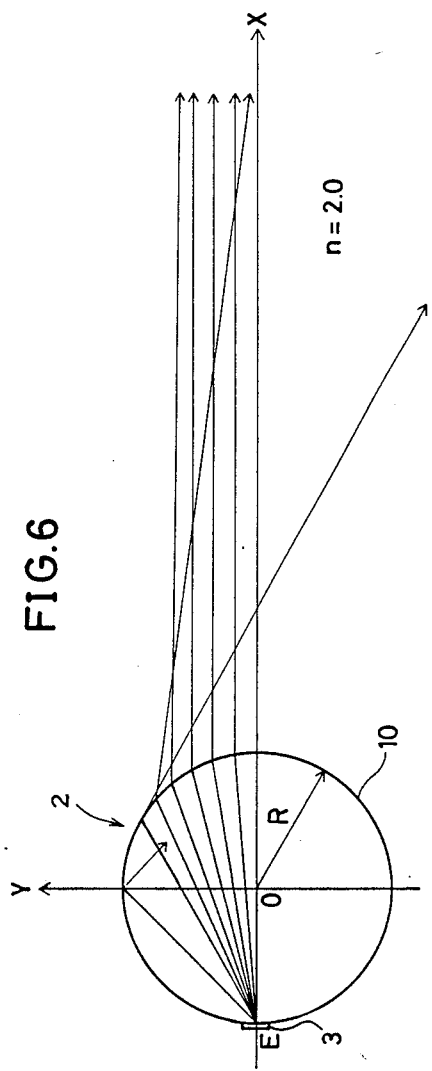
FIGS. 6 to 10 illustrate a second embodiment of the present invention.

Referring to FIG. 6, light reflected by the diffused reflection layer 3 is refracted at the outer peripheral surface of the rod 10. The refracted light is converged on the X axis at some distance from the center O.

Figure 7:
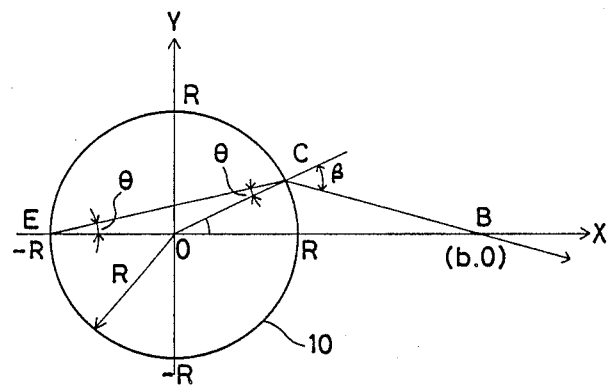

FIG. 7 illustrates why the luminous fluxes are condensed by the rod 10 of FIG. 6.

FIG. 7 shows a transparent rod 2 having a circular cross section of radius R. On an X-Y coordinate system with the center O being the origin, the light is reflected at the angle $\theta$ with the axis X from the point E. The reflected light is refracted at the point C and intersects with the X axis at the point B.

When the angle of the line BC and the radius line OC is represented by $\beta$ and the refractive index is represented by n, the following relation applies:

$$n\sin\theta = \sin\beta$$

Since the coordinate value of the point C is ($R\cos2\theta$, $R\sin2\theta$), the line BC can be represented by the following equation:

$$Y = -\tan(\beta - 2\theta)(X - R\cos2\theta) + R\sin2\theta \quad (5)$$

Assuming that the coordinate value of the point B is (b, 0), the value b can be calculated in the equation (5) with X=b, Y=0.

$$0 = -\tan(\beta - 2\theta)(b - T\cos2\theta) + R\sin2\theta$$

$$b = R\cos2\theta + \frac{R\sin2\theta}{\tan(\beta - 2\theta)}$$

$$\therefore \frac{b}{R} = \frac{\sin(\beta - 2\theta)\cos2\theta + \cos(\beta - 2\theta)\sin2\theta}{\sin(\beta - 2\theta)}$$

$$= \frac{\sin\beta}{\sin(\beta - 2\theta)}$$

$$= \frac{n\sin\theta}{\sin\beta\cos2\theta - \cos\beta\sin2\theta}$$

$$= \frac{n\sin\theta}{n\sin\theta\cos2\theta - 2\sin\theta\cos\theta \sqrt{1 - n^2\sin^2\theta}}$$

$$= \frac{1}{\cos2\theta - 2\cos\theta \sqrt{\frac{1}{n^2} - \sin^2\theta}}$$

To make $b \geq R$, the following inequality should be satisfied.

$$0 < \cos2\theta - 2\cos\theta \sqrt{\frac{1}{n^2} - \sin^2\theta} \leq 1$$

To satisfy the former part of the inequality $$0 \leq \cos2\theta - 2\cos\theta \sqrt{\frac{1}{n^2} - \sin^2\theta}, \quad (I)$$

then $$0 \leq \cos2\theta - 2\cos\theta \sqrt{\frac{1}{n^2} - \sin^2\theta} < \cos2\theta$$

$$\therefore 4\cos^2\theta \left(\frac{1}{n^2} - \sin^2\theta\right) \leq (2\cos^2\theta - 1)^2$$

$$4 \frac{1}{n^2} \cos^2\theta - 4\cos^2\theta + 4\cos^4\theta \leq 4\cos^4\theta - 4\cos^2\theta + 1$$

$$\therefore n^2 \geq 1 \quad \cos\theta \geq 0 \quad n \geq 2\cos\theta$$

Namely, when $n \geq 2$, $b \geq R$, regardless of the value of $\theta$, the luminous fluxes are condensed.

When $n < 2$, then $b > 0$, provided the $\cos > n/2$, so that the reflected luminous fluxes are diffused.

To satisfy the latter part of the inequality $$\cos2\theta - 2\cos\theta \sqrt{\frac{1}{n^2} - \sin^2\theta} \leq 1, \quad (II)$$

when the inequality is transformed, $$-2\sin^2\theta - 2\cos\theta \sqrt{\frac{1}{n^2} - \sin^2\theta} \leq 1,$$

The equation can always be satisfied regardless of the value of $\theta$.

FIGS. 8A to 8E show optical paths when the rods are formed of transparent materials having different refractive indices n. When $n < 2$, then the luminous fluxes reflected from the layer 3 are diffused. However, as the value of n increases, the luminous fluxes tend to be condensed. When $n \geq 2$, the luminous fluxes are condensed within a narrow range.

To condense luminous fluxes by using a rod shaped linear light diffusion apparatus, a cylindrical rod may be formed with a transparent material whose refractive index (n) is greater than 2. Examples of materials having high refractive indices (and the wavelength of the light) are shown in the following table.

| | Optical transmission range (μm) | measuring light (μm) | refractive index (μm) |
|---|---|---|---|
| FDS10(HOYA) optical glass | 0.42–2 | 0.486 0.656 | 0.02 1.97 |
| PbM$_0$O$_4$ lead molybdate | 0.42–5.5 | 0.633 | 2.37 |
| TeO$_2$ tellurium dioxide | 0.35–5 | 0.633 | 2.26 |
| LiNbO$_3$ lithium niobate | 0.4–0.5 | 0.633 | 2.20 |
| Ge germanium | 2–20 | 2.48 | 4.08 |
| ZrO$_2$—Y$_2$O$_3$ firenite | 0.5–6 | 0.633 | 2.17 |
| Si silicon | 1–15 | | 3.50 |

FDS10 (HOYA) may be used as a material having the refractive index of 2, PbM$_0$O$_4$ and TeO$_2$ may be used as the materials having the refractive index higher than 2, and Ge may be used as a material having the refractive index of 4.

As shown in the table, Ge transmits light of the infrared region having a wavelength of 2 to 20 μm. Therefore, a cylindrical rod can be used as a linear condensing heat source.

Figure 9:
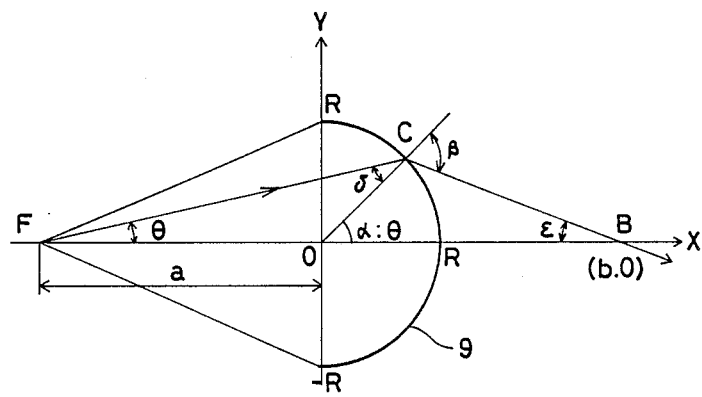

In a modification of the second embodiment, the cross sectional shape of the rod is not a perfect circle but rather a combination of a triangle and a semicircule, as shown in FIG. 9. The distance a between the center O of the semicircle portion and the linear diffused reflection layer E is larger than the radius R of the semicircular portion In this case, also, luminous fluxes can be condensed by a conventional rod formed of a transparent material having a low refractive index.

FIG. 9 shows a cross section of a rod 13 which is, on the right side of the Y axis, a semicircle having a radius R and, on the left side, an isosceles triangle whose vertex is a point F (coordinate valye: (−a, 0)) which is spaced apart from the center O by a distance (a)(a>r).

If the angle of reflection from the point F with the X axis is represented by $\theta$, the intersecting point of the light beam refracted at the point C with the X axis is represented by B, the incident angle at the point C is represented by $\delta$, the angle of irradiation is represented by $\beta$, and the angle of intersection of the refracted light with the X axis is represented by $\epsilon$, then $$\epsilon = \beta - (\delta + \theta)$$

$$n\sin\delta = \sin\beta$$

$$\frac{R}{\sin\theta} = \frac{-a}{\sin\delta}$$

$$\therefore \sin\delta = -\frac{a}{R}\sin\theta$$

$$\cos\delta = \sqrt{1 - \frac{a^2}{R^2}\sin^2\theta}$$

$$\sin\beta = -\frac{a\,n}{R}\sin\theta$$

$$\cos\beta = \sqrt{1 - \frac{a^2 n^2}{R^2}\sin^2\theta}$$

For the optical path BC to intersect the X axis, $\Sigma \geq 0$, namely, $\sin\epsilon \geq 0$.

$$\sin\epsilon = \sin\{\beta - (\delta + \theta)\} \quad (6)$$
$$= \sin\beta(\cos\delta\cos\theta - \sin\delta\sin\theta) -$$
$$\cos\beta(\sin\delta\cos\theta + \cos\delta\sin\theta)$$
$$= \frac{a^2 n^2}{R^2}\sin\theta \left\{ \cos\theta\sqrt{\frac{R^2}{a^2} - \sin^2\theta} - \sin^2\theta - \right.$$
$$\cos\theta\sqrt{\frac{R^2}{a^2 n^2} - \sin^2\theta} -$$
$$\left. \sqrt{\left(\frac{R^2}{a^2} - \sin^2\theta\right)\left(\frac{R^2}{a^2 n^2} - \sin^2\theta\right)} \right\}$$

The terms in { } must be no less than zero ($\geq 0$) to make the value $\sin\epsilon \geq 0$.
By solving this inequality, $$\frac{a}{R} \leq \frac{-1}{\sqrt{n^2 - 2n\cos\theta + 1}} \quad (7)$$

To condense the luminous fluxes regardless of the value of $\theta$, the following inequality should be satisfied.

$$\frac{a}{R} \leq \frac{1}{n - 1} \quad (8)$$

For example, when a transparent material whose refractive index n=1.5, all luminous fluxes can be irradiated and condensed by setting a $\leq -2R$. In this case, however, the position of the intersecting point B is a function of the angle $\theta$, so that the linearly condensed state cannot be provided. FIGS. 10A to 10E schematically show optical paths when the refractive index n of the rod and the distance a between the center of the rod and the light emitting portion are variously changed. In these examples, the luminous fluxes are not linearly condensed.

If, n=2.0, then $a \leq -R$, which corresponds to the above described circular rod.

The respective rods shown in FIGS. 10A to 10E may be utilized as linear light sources for illuminating a region of a prescribed width. By appropriately selecting the values of n and a, the distribution of illuminance within the region to be irradiated can be adapted to meet the desired conditions.

(iii) Third Embodiment

Figure 11:
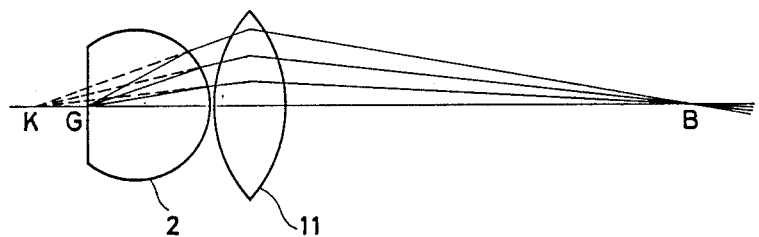
FIGS. 11 to 14 illustrate a third embodiment of the present invention.
Figure 8A:
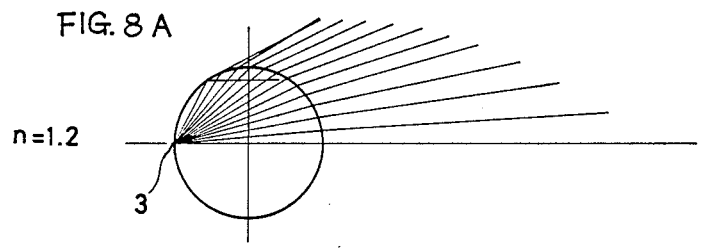
Figure 8B:
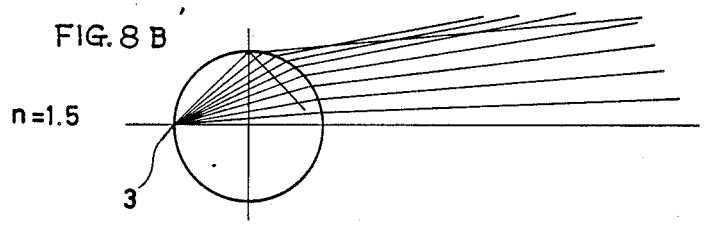
Figure 8C:
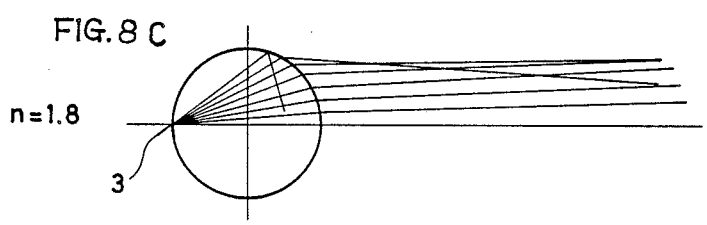
Figure 8D:
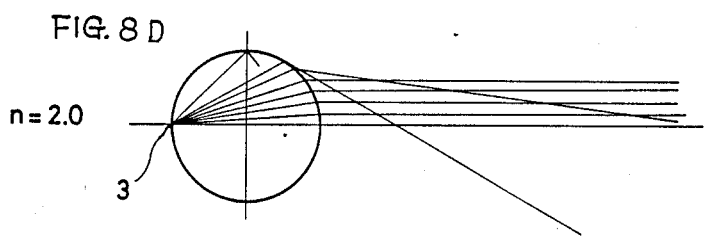
Figure 8E:
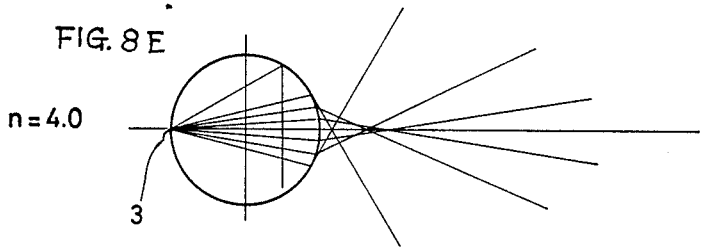
Figure 10:
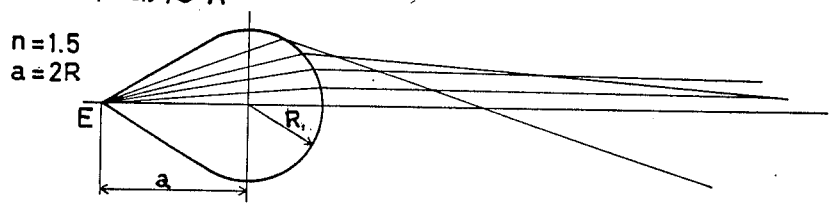
Figure 10:
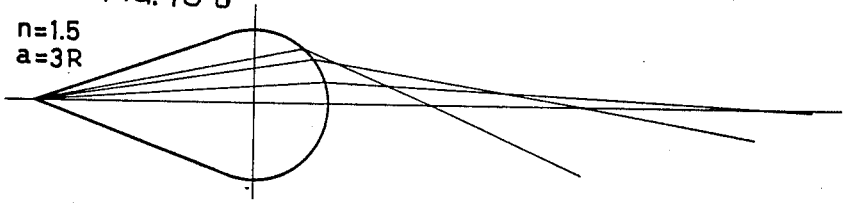
Figure 10:
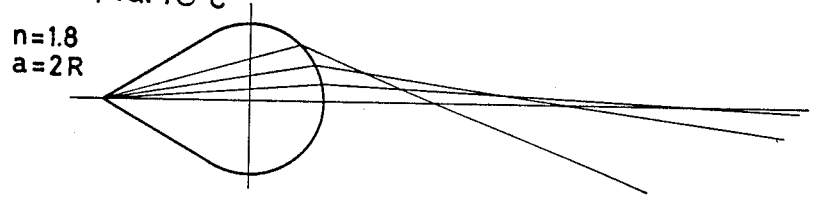
Figure 10:
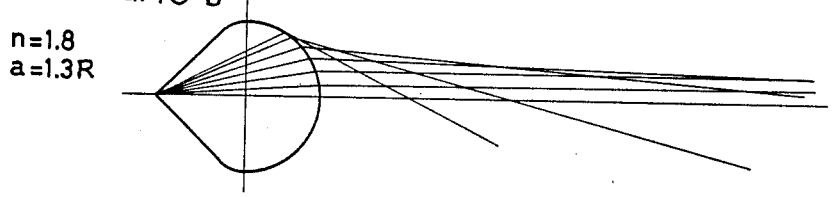
Figure 10:
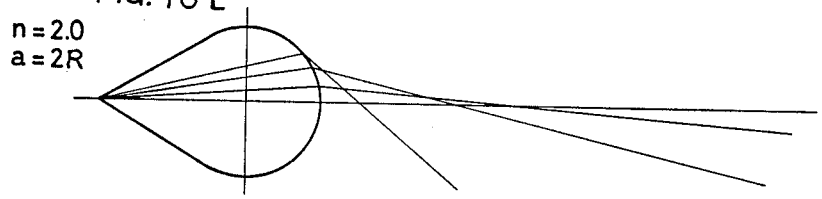

FIG. 11 illustrates a third embodiment of the present invention in which a rod 2 with a portion of the cylinder cut and a condenser lens 17, such as a cylindrical lens or a linear Fresnel lens, are adjacent to each other on an optical axis. The luminous fluxes refracted at the diffused reflection layer 3 formed at the portion G of the rod 2 are condensed by the condenser lens 17 and condensed on the point B on the optical axis of the condenser lens 17.

Figure 12:
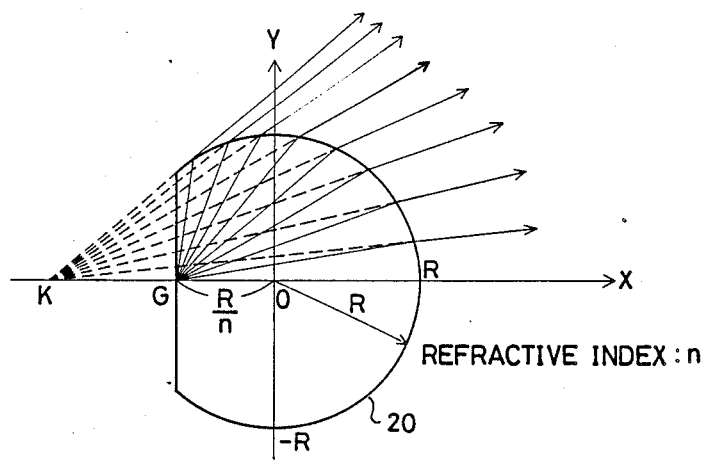

To condense the luminous fluxes at the point B as shown in FIG. 11, the light reflected from the point G must be diffused from one point K on a line passing through the points O–G, as shown by the dotted lines in FIG. 12. To accomplish this, the position G of the diffused reflection layer must be set at a distance R/n from the center O. The reason for this will be described in the following.

Figure 13A:
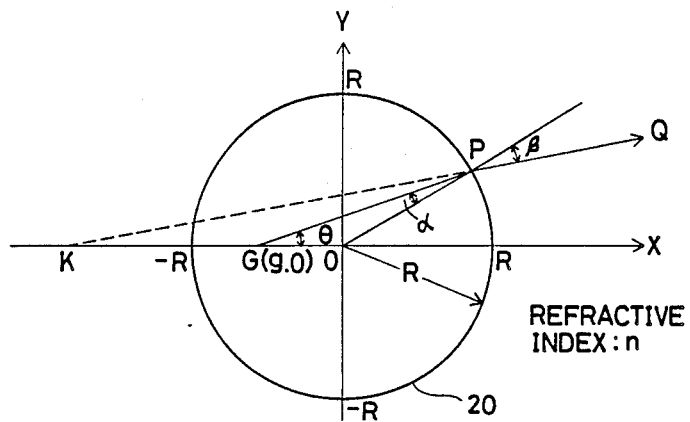

FIG. 13A is a cross sectional view of a cylindrical rod having a refractive index of n and a radius of R.

Let us assume an X-Y coordinate system with the center O of the rod 20 being the origin, and wherein an optical path is reflected from a point G (coordinate value (g, 0)) on the X axis, refracted at a point P on the peripheral surface, and directed in the direction Q. When the intersection of the X axis and a line passing through the points P and Q shown by the dotted line is represented by K, $\angle APO=\alpha$, $\angle KPO=\beta$ and $\angle PAO=\theta$, then $$n\sin\alpha = \sin\beta$$

since the refractive index of the rod 20 is n.
The line KP can be represented by the following equation.

$$Y = \tan(\alpha + \theta - \beta)\{X - R\cos(\alpha + \theta)\} + R\sin(\alpha + \theta) \quad (9)$$

Where $$\frac{-g}{\sin\alpha} = \frac{R}{\sin\theta}$$

$$\therefore \sin\alpha = -\frac{g}{R}\sin\theta \quad \cos\alpha = \sqrt{1 - \frac{g^2}{R^2}\sin^2\theta}$$

$$\sin\beta = -\frac{gn}{R}\sin\theta \quad \cos\beta = \sqrt{1 - \frac{g^2 n^2}{R^2}\sin^2\theta}$$

The coordinate value of the point K is (k, 0), and the value k can be calculated as the value of X (=k) when Y=0 in the equation (9).

$$k = R\cos(\alpha + \theta) - \frac{R\sin(\alpha + \beta)}{\tan(\alpha + \theta - \beta)} \quad (10)$$

By dividing both sides of the equation (10) by (R), $$\begin{aligned}\frac{k}{R} &= \frac{\sin(\alpha + \theta - \beta)\cos(\alpha + \theta) - \cos(\alpha + \theta - \beta)\sin(\alpha + \theta)}{\sin(\alpha + \theta - \beta)} \\ &= \frac{-\sin\beta}{\sin(\alpha + \theta - \beta)} \\ &= \frac{-\sin\beta}{(\sin\alpha\cos\theta + \cos\alpha\sin\theta)\cos\beta - (\cos\alpha\cos\theta - \sin\alpha\sin\theta)\sin\beta} \\ &= \frac{\frac{gn}{R}\sin\theta}{\left(-\frac{g}{R}\sin\theta\cos\theta + \sqrt{1 - \frac{g^2}{R^2}\sin^2\theta} \cdot \sin\theta\right)\sqrt{1 - \frac{g^2n^2}{R^2}\sin^2\theta} - \left(\sqrt{1 - \frac{g^2}{R^2}\sin^2\theta} \cdot \cos\theta + \frac{g}{R}\sin^2\theta\right)\left(-\frac{gn}{R}\sin\theta\right)} \\ &= \frac{\frac{gn}{r}}{\left(\sqrt{1 - \frac{g^2}{R^2}\sin^2\theta} - \frac{g}{R}\cos\theta\right)\sqrt{1 - \frac{g^2n^2}{R^2}\sin^2 + \frac{gn}{R}\left(\sqrt{1 - \frac{g^2}{R^2}\sin^2\theta} \cdot \cos\theta + \frac{g}{R}\sin^2\theta\right)}}\end{aligned} \quad (11)$$

Assuming that $g = R/n$ in the equation (11), $$\begin{aligned}\frac{k}{R} &= \frac{-1}{\left(\sqrt{1 - \frac{1}{n^2}}\sin^2 + \frac{1}{n}\cos\theta\right)\cos\theta - \left(\sqrt{1 - \frac{1}{n^2}}\sin^2\theta \cdot \cos\theta + \frac{1}{n}\sin^2\theta\right)} \\ &= -n \\ \therefore k &= -nR\end{aligned} \quad (12)$$

When $g = -R/n$, the point K is spaced from the origin (O) a distance "$-nR$". This term does not include the angle $\theta$. Thus, the position of the point K is constant. Specifically, the optical paths of light beams reflected from the point G and refracted at the peripheral surface of the rod 20 all converge on the point K.

Therefore, when the rod 20 is cut at a surface parallel to the Y axis through the point G (which is spaced apart from the origin (O) by the distance "R/n"), a narrow diffused reflection layer is formed in the direction of an axis passing through the point G and the light beams enter the end surface of the rod 20, then the light beams dispersed by the diffused reflection layer pass through the optical path reflected from the point K. Therefore, by condensing the reflected light by locating a cylindrical lens 11 (or a linear Fresnel lens) next to the rod 20, all light beams are converged on the point B on the optical axis. Consequently, the light can be condensed more narrowly than in the prior art.

Figure 13B:
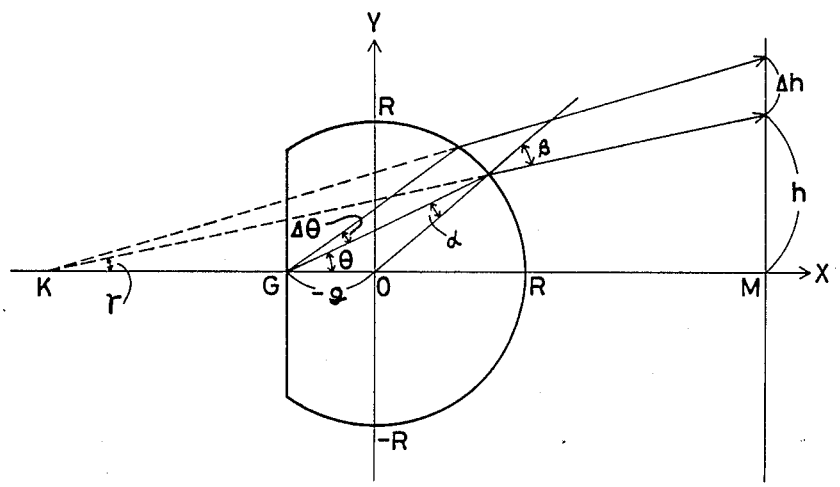

The distribution of illuminance of such a cylindrical lens will be described in the following. Referring to FIG. 13B, let us consider the illuminance on a surface (represented as a line in the figure) which is vertical to the X axis and passes through the point M on the X axis.

The following equations can be applied as in the foregoing.

$$n\sin\alpha \quad (13)$$

$$k = -nR \quad (14)$$

$$g = -R/n \quad (15)$$

$$\gamma + \beta = \alpha + \theta \quad (16)$$

$$h = (m - k)\tan\gamma \quad (17)$$

$$\frac{R}{\sin\theta} = \frac{-g}{\sin\alpha} \quad (18)$$

By substituting the equation (18) with the equation (15), $$\theta = \beta \quad (19)$$

by substituting the equation (16) with the equation (11), $$\gamma = \alpha \quad (20)$$

by substituting the equation (13) with the equation (19), $$\sin\alpha = \frac{1}{n}\sin\theta$$

accordingly, $$\cos\alpha = \sqrt{1 - \frac{1}{n^2}\sin^2\theta} \quad (21)$$

by substituting the equation (17) with the equation (20), $$h = (m - k)\tan\alpha$$

by substituting the above equation with the equation (21), $$h = (m - k) \cdot \frac{\frac{1}{n} \sin\theta}{\sqrt{1 - \frac{1}{n^2} \sin^2\theta}} \quad (22)$$

If a uniform diffusion light source is at the point (g, 0), the optical energy emitted from the light source is proportional to the angle $\theta$. Let us consider a small distance ($\Delta h$) in the direction of the Y axis at a point (the coordinate value is (m, h)) at which the illuminance is to be evaluated, assuming that the illuminance is uniform along the distance $\Delta h$.

Assuming that the illuminance is proportional to the optical energy incident on a unit area, then the illuminance is proportional to ($\Delta\theta/\Delta h$) (where $\Delta\theta$ is an increment of the angle $\theta$ corresponding to $\Delta h$).

Since $$\lim_{\Delta h \to 0} \frac{\Delta\theta}{\Delta h} = \frac{d\theta}{dh}$$

the illuminance at the point (m, h) is proportional to ($d\theta/dh$).

Accordingly, the equation (22) can be transformed into $$\frac{d\theta}{dh} = \frac{1}{dh/d\theta} = \frac{n}{m-k} \cdot \frac{\left(1 - \frac{1}{n^2} \sin^2\theta\right)^{3/2}}{\cos\theta} \quad (23)$$

Since the value of the distribution illuminance is a ratio of the above mentioned point and a point on the X axis (whose coordinate value is (m, 0)), the ratio (I) of illuminance will be $$I = \frac{\left(1 - \frac{1}{n^2} \sin^2\theta\right)^{3/2}}{\cos\theta} \quad (24)$$

The distribution of illuminance calculated in accordance with the equation (24) will be shown in the following.
When n=1.5

When n = 1.5

| $\theta°$ | 0 | 10 | 20 | 30 | 40 | 50 | 60 | 70 |
|---|---|---|---|---|---|---|---|---|
| I% | 100 | 99.5 | 98.2 | 96.8 | 96.3 | 98.9 | 108.9 | 138.5 |

The distribution of illuminance of more than 96% of the illuminance of the reference point within the range of $\theta \leq 50°$. Therefore, this rod shaped linear light diffusion apparatus is a superior surface light source.
When n=1.8

When n = 1.8

| $\theta°$ | 0 | 10 | 20 | 30 | 40 | 50 | 60 |
|---|---|---|---|---|---|---|---|
| I% | 100.1 | 100 | 100.7 | 102.4 | 106.4 | 115.3 | 134.7 |

Namely, when the refractive index n of the transparent material constituting the cylindrical rod is no less than $\sqrt{3}$, the illuminance is a minimum at the optical axis (where $\theta = 0°$), and it becomes brighter at the periphery.

The cross sectional shape of the rod may be changed. That is, the cylindrical rod need not be cut at a flat surface spaced apart from the central line by the distance of R/n.

Figure 14A:
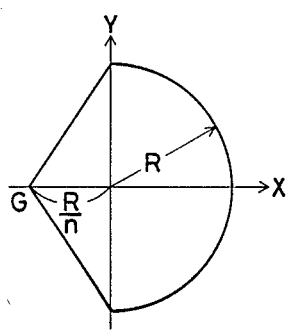

For example, the cross section may be a combination of a semicircle having a diameter R on the right side of the Y axis and an isosceles triangle on the left side (with opposing ends in the Y axis of the semicircles and a point G which is spaced apart from the center O by the distance R/n being connected), and the diffused reflection layer may be located at the point G, as shown in FIG. 14A. The cross section may comprise a curve connecting the point G with the opposing ends in the Y axis of the semicircle as shown in FIG. 14B.

Figure 14B:
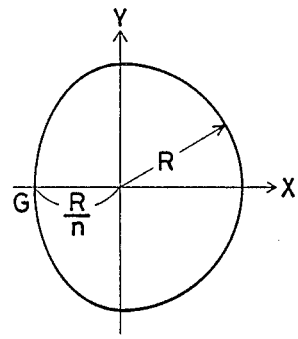

If it is technically difficult to form the rod having the cross section shown in FIG. 14A or 14B with an integral transparent material, the semicircle and the triangle or oval portion may be separately manufactured and thereafter attached to each other by CanadaBalsam or the like.

Figure 15:
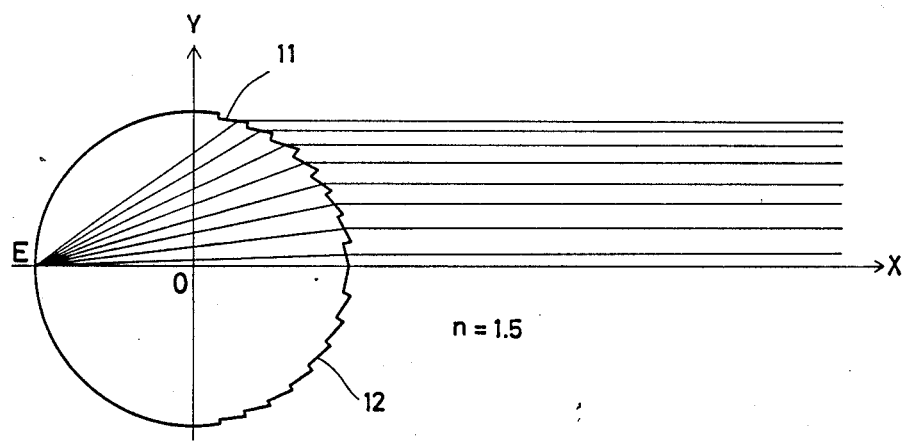
FIG. 15 is a schematic diagram of another embodiment of the invention.

(2) A Rod Shaped Linear Light Diffusion Apparaut for Providing Parallel Luminous Fluxes FIG. 15 illustrates an application of the principles of the first embodiment (in which light is condensed). However, in the embodiment illustrated in FIG. 15, light from the reflecting layer 3 of the rod 12 form parallel beams as they are retracted at the saw tooth shaped grooves 11.

This corresponds to a case where b=$\infty$ and therefore K=0 in the above described equation $$K = \frac{R\sin 2\theta}{\sqrt{b^2 - 2bR\cos 2\theta + R^2}},$$

$$\therefore \tan\gamma = \frac{n\sin\theta}{n\cos\theta - 1}$$

Therefore, by providing a transparent rod 12 with the angles of the surfaces of the respective saw tooth shaped grooves defined in accordance with the above equation, the luminous fluxes reflected at the point E will be parallel luminous fluxes in the direction of the X axis as shown in FIG. 15. In the embodiment shown in FIG. 15, the refractive index of the transparent rod is n=1.5 and the increment of the angle of the reflected luminous fluxes is 5°. In this case also, the increment of the angle can be arbitrarily set as small as desired.

Figure 16:
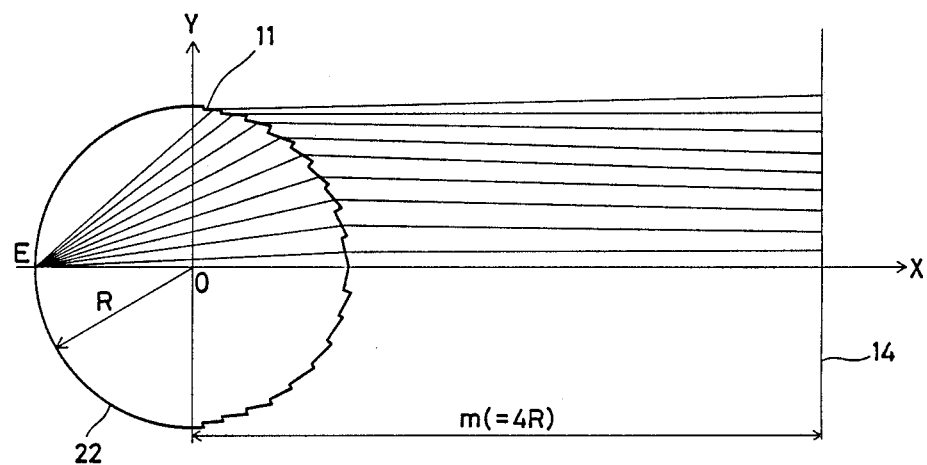
Figure 17:
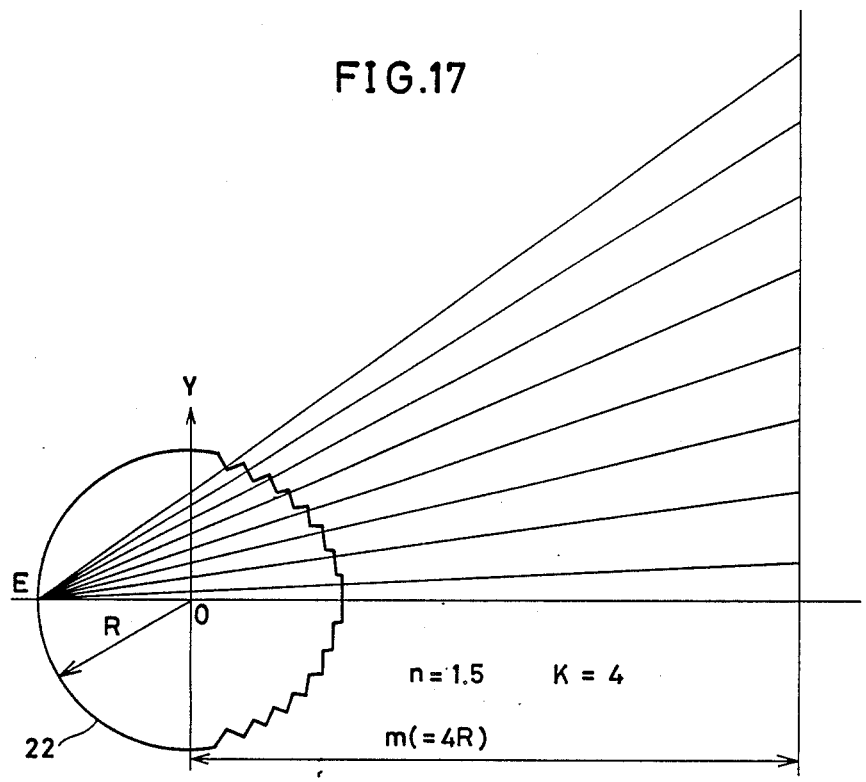

(3) A Rod Shaped Linear Light Diffusion Apparatus Capable of Providing Uniform Distribution of Illuminance FIGS. 16 and 17 show other applications of the principles of the first embodiment. However, the embodiments of FIGS. 16 and 17 provide luminous fluxes whose distribution of illuminance is uniform.

Figure 18:
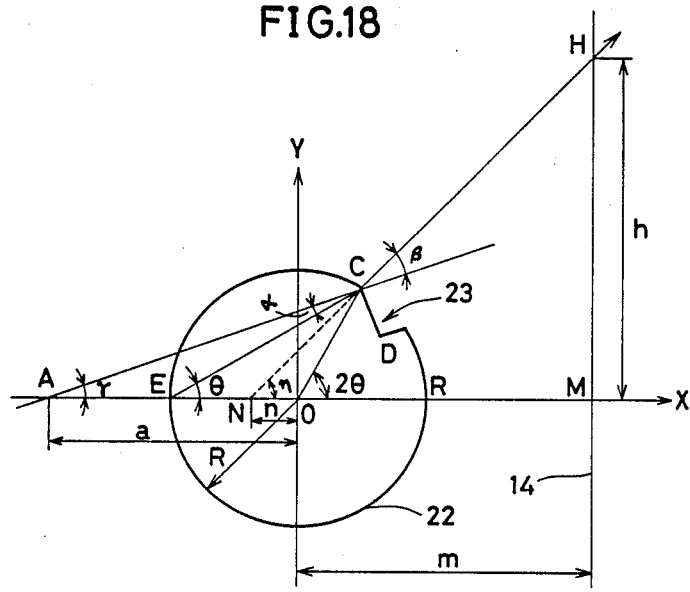

FIG. 18 illustrates the principles employed by the embodiments of FIGS. 16 and 17.

FIG. 18 is a cross sectional view of a cylindrical rod 22 having a radius R. The rod 22 is formed of a transparent material having a refractive index of n as in the embodiment of FIG. 5. In an X-Y coordinate system with the center O of the rod 22 being the origin, luminous fluxes incident on the end surface of the rod 22 are dispersed by a diffused reflection layer formed at the point E on the outer peripheral surface on the X axis.

At that portion on the peripheral surface of the rod 22 which is opposed to the point E, a plurality of saw tooth shaped grooves 23 are provided. The grooves 23 are parallel to each other in the longitudinal direction.

Figure 5:
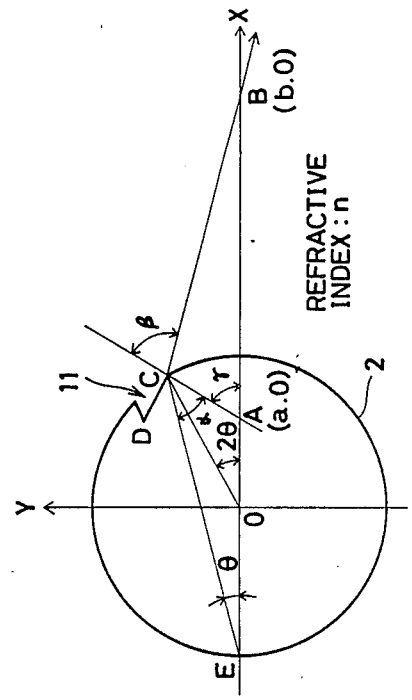

As in FIG. 5, only one of the grooves 23 is shown in FIG. 18. The luminous fluxes from the point E are refracted at the point C and are projected on the point H on the surface 14 to be illuminated. In FIG. 18, the points corresponding to those in FIGS. 5 and 13B are represented by the same reference characters, wherein point A: the intersection of the normal of the CD surface at the point C and the X axis, having the coordinates (a, 0)
point N: the intersection of a dotted line which is the extension of the refracted luminous flux and the X axis, having the coordinates (n, 0)
point C: point of refraction of the luminous flux
CD: surface of the groove 23
point E: point of reflecting luminous flux having the coordinates (−R, 0)
point M: the intersection of the X axis and the surface 14 to be illuminated, having the coordinates (m, 0)
point H: a point of projection of the luminous flux on the surface 14, having the coordinates (m, h)
$\alpha$: incident angle of the luminous flux at the point C
$\beta$: angle of irradiation of the luminous flux at the point C
$\gamma$: angle of the normal CA of the surface CD with the X axis
$\eta$: angle of the refracted luminous flux CH (NC) with the X axis.

Now, the following relations can be applied.

$$n\sin\alpha = \sin\beta$$

$$\gamma = \theta - \alpha = \eta = \beta$$

Let us consider the distribution of illuminance at the surface 14 to be illuminated. The idea of the distribution of illuminance which will be described in the following is similar to that disclosed in(i) and (iii).

Figure 19:
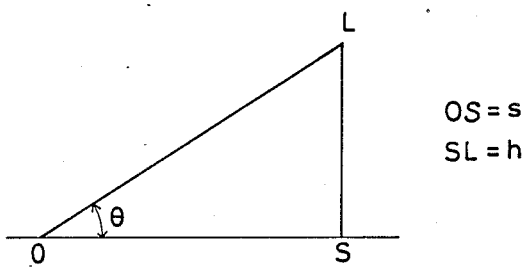
FIGS. 16 to 19 illustrate a rod shaped linear light diffusion apparatus capable of providing uniform distribution of illuminance in accordance with another embodiment of the present invention.

Referring to FIG. 19, assuming that the point 0 represents a linear light source which is elongated in a direction vertical to the plane of the drawing, SL represents a surface to be illuminated positioned at a distance S from the point O. It is assumed that the linear light source O emits light uniformly in all directions. The illuminance at the surface SL is uniform at any cross section in the direction vertical to the plane of the drawing, so that we may consider the illuminance on a segment SL at an arbitrary cross section.

When we consider only the luminous fluxes from the light source which are on the plane of the drawing, the illuminance at the point L is inversely proportional to the distance from the light source and is directly proportional to the cosine (cos) of the angle between the normal of the surface SL at the point L and the luminous flux.

$$\tan\theta = \frac{h}{s} \quad \frac{d\theta}{\cos^2\theta} = \frac{dh}{s} \quad \frac{d\theta}{dh} = \frac{\cos^2\theta}{s}$$

$$\therefore \frac{d\theta}{dh} = \frac{\cos\theta}{\left(\frac{s}{\cos\theta}\right)}$$

Where $\cos\theta$: a cosine of the angle between the normal of the SL surface and the luminous flux, and
$s/\cos\theta$: distance between OL Namely, the illuminance at the point L is directly proportional to $d\theta/dh$.

Therefore, the distribution of illuminance SL becomes uniform when $$\frac{d\theta}{dh} = \frac{1}{k} \quad (k \text{ is a constant})$$

namely, $h = k\theta$.

Referring again to FIG. 18, $$\tan\eta = \frac{h - R\sin2\theta}{m - R\cos2\theta}$$

By substituting $h - k\theta$ $$\tan\eta = \frac{k\theta - R\sin2\theta}{m - R\cos2\theta}$$

$$\eta = \tan^{-1}\frac{k\theta - R\sin2\theta}{m - R\cos2\theta} \quad (25)$$

$$\sin\beta = \sin(\eta + \alpha - \theta)$$
$$= \sin(\eta - \theta)\cos\alpha + \cos(\eta - \theta)\sin\alpha$$

$$n\sin\alpha = \sin(\eta - \theta)\cos\alpha + \cos(\eta - \theta)\sin\alpha$$

$$\{-\cos(\eta - \theta)\} = \sin(\eta - \theta)\cos\alpha$$

$$\tan\alpha = \frac{\sin(\eta - \theta)}{n - \cos(\eta - \theta)}$$

$$\alpha = \tan^{-1}\frac{\sin(\eta - \theta)}{n - \cos(\eta - )}$$

$$\gamma = \theta - \alpha - \tan^{-1}\frac{\sin(\eta - \theta)}{n - \cos(\eta\theta)} \quad (26)$$

In accordance with the equation (26), the angle $\gamma$ of the normal AC (FIG. 18) with the X axis at a point where the luminous flux is reflected from the point E with the angle $\theta$ can be determined. By forming a plurality of saw tooth shaped grooves 23 in accordance with this value, the surface 14 to be illuminated can be illuminated with a uniform distribution of illuminance at a position spaced from the center O of the rod 22 by the distance m. The factor of the distance m of irradiation at the equation (26) is included in the data of the angle ($\eta$ shown in the equation (25).

FIGS. 16 and 17 are cross sectional views of transparent rod shaped linear light diffusion with uniform distribution of illuminance, based on the above described theory In both embodiments, the rod 22 has a refractive index of n=1.5, the distance m between the center O of the rod and the surface 14 to be illuminated is m=4R, and the increment of the angle of the luminous flux reflected from the point E is 5°. In FIG. 16, the constant k=1. In FIG. 17, the constant k=4.

In each of the embodiments shown in FIGS. 16 and 17, the angle of the surface of the saw tooth shaped groove 23 formed on the surface from which the luminous fluxes are emitted is based on the above described equation. By providing such grooves 23 on the transparent rod 22, the luminous fluxes reflected from the point E (with equal angular increments) are projected on the surface to be illuminated 14 with a constant pitch. Therefore, uniform distribution of illuminance can be provided in the direction of the Y axis.

In the embodiments of FIGS. 16 and 17, the angular increments between the luminous fluxes reflected from the point E is 5°. By setting smaller increments, the uniformity of the distribution of illuminance can be further improved.

If the rod is formed of a soft material such as an acrylic resin, a plurality of longitudinal saw tooth shaped grooves can be provided on the peripheral surface of the transparent rod by a diamond tool. If the rod is formed of a fragile material such as optical glass or quartz, and it is difficult to cut the saw tooth shaped grooves, then a flat plate of an acrylic resin may be applied on the peripheral surface of the rod, and the grooves may be formed in the acrylic resin plate.

No auxiliary optical system (such as a cylindrical lens) need be used with the invention. As a result, the structure of a copying machine, a facsimile, or a scanner, such as a line sequential image scanner, can be simple and compact. The transparent rod shaped linear light diffusion apparatus of the present invention can be used as a general illuminating apparatus to provide desired illumination.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A method of converging light rays, said method comprising the steps of:
   (a) transmitting light in an axial direction through a transparent axial rod;
   (b) irregularly reflecting rays of said light from an elongated first surface of said transparent axial rod; and
   (c) converging said rays by refracting said rays at an elongated second surface of said transparent axial rod.

2. A system for converging light rays, said system comprising:
   a transparent axial rod for transmitting light in an axial direction, said transparent axial rod including an elongated first surface for irregularly reflecting rays of said light, said transparent axial rod including an elongated second surface for converging said rays by refracting said rays.

3. The system of claim 2, wherein said rod is generally cylindrical, said rod including a first end for receiving said light and a second end for reflecting said light.

4. The system of claim 2, wherein said second surface includes a plurality of saw tooth shaped grooves for refracting said rays.

5. The system of claim 4, wherein each of said grooves satisfies the following relationship:

$$\tan\gamma = \frac{n\sin\theta + K}{n\cos\theta - \sqrt{1 - K^2}};$$

wherein:
   $\gamma$ = the angle between (1) a normal to a refracting surface of said groove and (2) the optical axis of said rays;
   n = the index of refraction of said second surface;
   $\theta$ = the angle between (1) a ray passing through said refracting surface and (2) said optical axis; and K is functionally related to the distance between the axis of said rod and the point at which said rays converge.

6. A method of collimating light rays, said method comprising the steps of:
   (a) transmitting light in an axial direction through a transparent axial rod;
   (b) irregularly reflecting rays of said light from and elongated first surface of said transparent axial rod; and
   (c) collimating said rays by refracting said rays at an elongated second surface of said transparent axial rod.

7. A system for collimating light rays, said system comprising:
   a transparent axial rod for transmitting light in an axial direction, said transparent axial rod including an elongated first surface for irregularly reflecting rays of said light, said transparent axial rod including an elongated second surface for collimating said rays by refracting said rays.

8. The system of claim 7, wherein said rod is generally cylindrical, said rod including a first end for receiving said light and a second end for reflecting said light.

9. The system of claim 7, wherein said second surface includes a plurality of saw tooth shaped grooves for refracting said rays.

10. The system of claim 7, wherein each of said grooves satisfies the following relationship:

$$\tan\gamma = \frac{n\sin\theta}{n\cos\theta - 1};$$

wherein:
   $\gamma$ = the angle between (1) a normal to a refracting surface of said groove and (2) the optical axis of said rays;
   n = the index of refraction of said second surface; and
   $\theta$ = the angle between (1) a ray passing through said refracting surface and (2) said optical axis.

11. A method of illuminating a surface with a uniform distribution of illuminance, said method comprising the steps of:
   (a) transmitting light in an axial direction through a transparent axial rod;
   (b) irregularly reflecting rays of said light from an elongated first surface of said transparent axial rod; and
   (c) illuminating a surface with a uniform distribution of illuminance by refracting said rays at an elongated second surface of said transparent axial rod.

12. A system for illuminating a surface with a uniform distribution of illuminance, said system comprising:
   a transparent axial rod for transmitting light in an axial direction, said transparent axial rod including a first surface for irregularly reflecting rays of said light, said transparent axial rod including an elongated second surface for illuminating a third surface with a uniform distribution of illuminance by refracting said rays.

13. The system of claim 12, wherein said rod is generally cylindrical, said rod including a first end for receiving said light and a second end for reflecting said light.

14. The system of claim 12, wherein said second surface includes a plurality of saw tooth shaped grooves for refracting said rays.

15. The system of claim 14, wherein each of said grooves satisfies the following relationship:

$$\gamma = \theta - \tan^{-1}\frac{\sin(\eta - \theta)}{n - \cos(\eta - \theta)};$$

wherein:
- γ = the angle between (1) a normal to a refracting surface of said groove and (2) the optical axis of said rays;
- θ = the angle between (1) a ray passing through said refracting surface and (2) said optical axis;
- n = the index of refraction of said second surface; and
- η = the angle between (1) a ray refracted by said refracting surface and (2) said optical axis.

16. A system for condensing light rays, said system comprising:
a transparent axial rod for transmitting light in an axial direction, said transparent axial rod including an elongated first surface for irregularly reflecting rays of said light, said transparent axial rod including an elongated second surface for condensing said rays by refracting said rays, said second surface having a semicircular cross-section.

17. The system of claim 16, wherein said rod is generally cylindrical, said rod including a first end for receiving said light and a second end for reflecting said light.

18. The system of claim 17, wherein the distance between (1) the center of said semicircular cross-section and (2) said first surface is a function of the radius of said semicircular cross-section and the index of refraction of said second surface.

19. The system of claim 17, wherein said second surface has an index of refraction which is greater than 2.

20. The system of claim 17, wherein said system is adapted for use as a heat source.

21. The system of claim 20, wherein said rod is formed of germanium.

22. The system of claim 17, wherein said rod has a circular cross-section.

23. The system of claim 17, wherein said rod has a combined semicircular and triangular cross-section.

* * * * *